United States Patent [19]

Umeda et al.

[11] Patent Number: 5,488,086

[45] Date of Patent: Jan. 30, 1996

[54] POLYCARBONATE RESIN COMPOSITION

[75] Inventors: Takashi Umeda; Masaya Okamoto, both of Ichihara, Japan

[73] Assignee: Idemitsu Petrochemical Co., Ltd., Tokyo, Japan

[21] Appl. No.: 209,591

[22] PCT Filed: Dec. 25, 1991

[86] PCT No.: PCT/JP91/01755

§ 371 Date: Jul. 28, 1992

§ 102(e) Date: Jul. 28, 1992

[87] PCT Pub. No.: WO92/12208

PCT Pub. Date: Jul. 23, 1992

Related U.S. Application Data

[63] Continuation of Ser. No. 916,002, Jul. 28, 1992, abandoned.

[30] Foreign Application Priority Data

| Dec. 27, 1990 | [JP] | Japan | 2-415108 |
| Dec. 27, 1990 | [JP] | Japan | 2-415109 |
| Dec. 27, 1990 | [JP] | Japan | 2-415110 |
| Dec. 27, 1990 | [JP] | Japan | 2-415111 |

[51] Int. Cl.$^6$ ............... C08L 69/00; C08L 83/10
[52] U.S. Cl. ............. 525/92 A; 525/92 E; 525/104; 525/446; 525/439; 525/464
[58] Field of Search ............. 525/92, 104, 464, 525/439, 446, 100, 92 A, 92 E

[56] References Cited

U.S. PATENT DOCUMENTS

| 3,189,662 | 6/1965 | Vaughn, Jr. | 528/29 |
| 3,832,419 | 8/1974 | Merritt, Jr. | 528/26 |
| 4,161,469 | 7/1979 | Legrand et al. | 525/446 |
| 4,224,715 | 9/1980 | Macke | 525/264 |
| 4,569,970 | 2/1986 | Paul et al. | 525/92 |
| 4,600,632 | 7/1986 | Paul et al. | 525/464 |
| 4,657,989 | 4/1987 | Evans | 525/464 |
| 4,681,922 | 7/1987 | Schmidt et al. | 525/474 |
| 4,732,949 | 3/1988 | Paul et al. | 525/464 |
| 4,861,829 | 8/1989 | Kress et al. | 525/92 |
| 4,945,148 | 7/1990 | Rich et al. | 528/26 |
| 5,100,960 | 3/1992 | Grigo et al. | 525/92 |

FOREIGN PATENT DOCUMENTS

| 0162245 | 11/1985 | European Pat. Off. . |
| 0188791 | 7/1986 | European Pat. Off. . |
| 0205012 | 11/1986 | European Pat. Off. . |
| 386511 | 2/1990 | European Pat. Off. . |
| 0376052 | 7/1990 | European Pat. Off. . |
| 0384460 | 8/1990 | European Pat. Off. . |
| 0386547 | 9/1990 | European Pat. Off. . |
| 0387570 | 9/1990 | European Pat. Off. . |
| 0434848 | 7/1991 | European Pat. Off. . |
| 0501347 | 9/1992 | European Pat. Off. . |
| 1513506 | 2/1968 | France . |
| 61-200161 | 9/1986 | Japan . |
| 61-215652 | 9/1986 | Japan . |
| 61-287956 | 12/1986 | Japan . |
| 62-146952 | 6/1987 | Japan . |
| 62-277464 | 12/1987 | Japan . |
| 62-285948 | 12/1987 | Japan . |
| 63-51452 | 3/1988 | Japan . |
| 63-213557 | 9/1988 | Japan . |
| 2-283761 | 11/1990 | Japan . |
| 2-279724 | 11/1990 | Japan . |
| 3-79626 | 4/1991 | Japan . |

OTHER PUBLICATIONS

Patent Abstracts of Japan, vol. 6, No. 231 (C–135) (1109) Nov. 1982; abstract of JP 57–133149.

Chemical Abstracts, vol. 90, No. 2, Jan. 1979, Sheludyakov et al, "Organosilicon polycarbonates", p. 7081. No. 7078y.

*Primary Examiner*—Ralph H. Dean
*Attorney, Agent, or Firm*—Frishauf, Holtz, Goodman, Langer & Chick

[57] ABSTRACT

A polycarbonate resin composition which is superior in impact resistance, fluidity, solvent resistance, wear resistance and sliding characteristics. The polycarbonate resin composition comprises (A) a mixture of polycarbonate (PC) and a polycarbonate-polydimethylsiloxane (PC-PDMS) copolymer and (B) at least one of (i) a thermoplastic resin such as a thermoplastic crystalline resin or a thermoplastic amorphous resin and (ii) a rubber elastomer.

20 Claims, No Drawings

POLYCARBONATE RESIN COMPOSITION

This application is a Continuation of application Ser. No. 07/916,002, filed Jul. 28, 1992, now abandoned, which is the United States national phase application of International Application No. PCT/JP91/01755 filed Dec. 25, 1991.

TECHNICAL FIELD

The present invention relates to a polycarbonate resin composition, and more particularly to a polycarbonate resin composition excellent in impact resistance, fluidity, solvent resistance, wear resistance and sliding characteristics, which comprises a novel polycarbonate-polydimethylsiloxane (PC-PDMS) copolymer and at least one of the group of thermoplastic crystalline resin, thermoplastic amorphous resin, fluorine resin and rubber-like elastomer.

BACKGROUND ARTS

Generally, polycarbonate resins are excellent in impact resistance, and improvement of them by blending with other resins have been widely attempted. For example, crystalline resins such as polyester and polyamide are added to improve the solvent resistance of a polycarbonate resin. However, mere addition of crystalline resin had a problem in lowering impact resistance, although solvent resistance is improved. To overcome the above problem, a composition obtained by blending polyalkylene terephthalate and polycarbonate-polysiloxane copolymer are blended with polycarbonate (Japanese Patent Application Laid-Open No. 215652/1986), a composition comprising polycarbonate-polysiloxane copolymer and polyamide (Japanese Patent Application Laid-Open No. 213557/1988) and so on have been proposed. Both the polycarbonate resin compositions, however, had a problem in that they were poor in heat resistance, although improved in impact resistance.

Further, attempts have been proposed to improve polycarbonate resins in low-temperature impact property by adding a thermoplastic amorphous resin such as acrylonitrile-butadiene-styrene (ABS), and styrene-maleic anhydride copolymer (SMA). By mere addition of thermoplastic amorphous resin, however, the impact resistance of the resulting polycarbonate resin was insufficient. In order to overcome the above problem, a polycarbonate resin comprising polycarbonate-polysiloxane copolymer, acrylonitrile-butadiene-styrene (ABS) and acrylonitrile-styrene (Japanese Patent Application No. 287956/1986), and a polycarbonate resin comprising polycarbonate-polysiloxane copolymer, and styrene-maleic anhydride copolymer (SAM) (Japanese Patent Application Laid-Open No. 146952/1987) have been proposed. Both of these polycarbonate resin compositions, however, had a problem in that they are poor in Izod impact resistance.

Moreover, attempts to improve the sliding characteristics of polycarbonate resin by adding fluorine resin, for instance, have been made. Polycarbonate resin compositions which resulted from these attempts are, for example, a polycarbonate resin comprising polycarbonate-polysiloxane copolymer, styrene-maleic anhydride copolymer (SMA), phosphide and polytetrafluoroethylene (Japanese Patent Application No. 277464/1987), and a polycarbonate comprising polycarbonate-polysiloxane copolymer, SMA and the like, phosphide, Teflon and acrylonitrile-butadiene-styrene (ABS) (Japanese Patent Application No. 285948/1987). In these polycarbonate resin compositions, however, although impact resistance was improved by the use of polycarbonate-polysiloxane, the effect of the improvement was not sufficient.

Furthermore, attempts have been made to improve the impact resistance of polycarbonate resin by adding a rubber-like elastomer. However, by mere addition of a rubber-like elastomer, improvement in impact resistance could not be expected in a range where strength and elasticity of a polycarbonate resin were not largely lowered. Polycarbonate resins which are improved in the above problem are a polycarbonate resin comprising polycarbonate-polysiloxane and acrylic rubber or graft copolymer to polydimethyl siloxane (PDMS), and rubber (Japanese Patent Application No. 200161/1986) and a polycarbonate resin comprising polycarbonate-polycyloxane and isobutylene (Japanese Patent Application No. 51452/1988). In these polycarbonate resin compositions, however, impact resistance is improved since polycarbonate-polysiloxane was used, but the effect in the improvement was small.

DISCLOSURE OF THE INVENTION

Recently, the group of the present Inventors have succeeded in developing a novel polycarbonate copolymer having a new structure which is improved in impact strength while maintaining the mechanical and optical properties inherent in the conventional polycarbonate (the Specification of WO91/00885). The present inventors have repeated earnest investigations to improve the quality of said novel polycarbonate copolymer while maintaining the advantages of the novel polycarbonate copolymer.

As the result, it was found that the novel polycarbonate copolymer can be further improved in impact resistance by blending a thermoplastic resin including a thermoplastic crystalline resin, thermoplastic amorphous resin and a fluorine resin, or a rubber-like elastomer, while improving fluidity, solvent resistance, wear resistance, sliding characteristics and heat resistance. The present invention has been accomplished based on such a finding.

The present invention provides a polycarbonate resin composition which comprises (A) polycarbonate-polydimethylsiloxane (PC-PDMS) copolymer which comprising a polycarbonate block represented by the general formula (a):

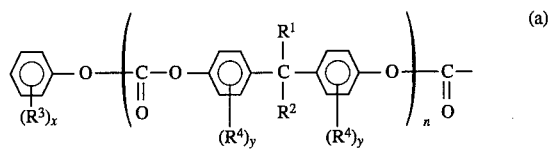

(wherein $R^1$ and $R^2$ are independently a hydrogen, an alkyl group having 1 to 4 carbon atoms, $R^3$ and $R^4$ are independently a halogen atom, or an alkyl group or aryl group having at most 20 carbons, x indicates an integer of 1 to 5, y indicates an integer of at most 4, and n indicates an integer of 1 to 100.), and a polydimethylsiloxane block represented by the general formula (b):

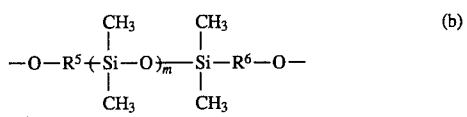

(wherein $R^5$ and $R^6$ are independently an organic residue containing an aromatic nucleus, and m indicates an integer of 100 or more.), said copolymer containing polydimethylsiloxane block in a proportion of 0.5 to 10% by weight, and having n-hexane soluble content of less than 1.0% by weight, and the viscosity average molecular weight of 10,000 to 50,000, and (B) at least one selected from the group of thermoplastic resin and rubber-like elastomer.

Therein thermoplastic resin includes thermoplastic crystalline resin, thermoplastic amorphous resin and fluorine resin.

Specifically, the present invention provides a polycarbonate resin composition comprising (A) 1 to 99% by weight of the above-mentioned polycarbonate-polydimethylsiloxane (PC-PDMS) copolymer and (B) 99 to 1% by weight of a thermoplastic crystalline resin.

The present invention also provides a polycarbonate resin composition comprising (A) 1 to 99% by weight of the above-mentioned polycarbonate-polydimethylsiloxane (PC-PDMS) copolymer and (C) 99 to 1% by weight of a thermoplastic amorphous resin.

Moreover, the present invention also provides a polycarbonate resin composition comprising (A) 60 to 99% by weight of the above-mentioned polycarbonate-polydimethylsiloxane (PC-PDMS) copolymer and (D) 40 to 1% by weight of a fluorine resin.

Further, the present invention also provides a polycarbonate resin composition comprising (A) 40 to 99% by weight of the above-mentioned polycarbonate-polydimethylsiloxane (PC-PDMS) copolymer and (E) 60 to 1% by weight of a rubber-like elastomer.

BEST MODE FOR CARRYING OUT THE INVENTION

The composition of the present invention comprises as the main ingredients (A) polycarbonate-polydimethylcyloxane (PC-PDMS) copolymer and (B) at least one selected from the group of thermoplastic resin and rubber-like elastomer, as described above.

Herein PC-PDMS copolymer as component (A) is a block copolymer comprising a polycarbonate (hereinafter sometimes referred to as PC) block represented by the general formula (a) and a polydimethylsiloxane (hereinafter sometimes referred to as PDMS) represented by the general formula (b), as mentioned above.

$R^1$ and $R^2$ in the general formula (a) indicate independently a hydrogen, an alkyl group having 1 to 4 carbon atoms, such as a methyl group, an ethyl group, an n-propyl group, an i-propyl group, an n-butyl group, an i-butyl group, an s-butyl group, and a t-butyl group. $R^3$ and $R^4$ in the general formula (a) indicate independently a hydrogen, a halogen (such as chlorine, fluorine, or iodine), an alkyl having 1 to 20 carbon atoms (such as methyl group, ethyl group, n-propyl group, i-propyl group, n-butyl group, i-butyl group, s-butyl group, t-butyl group, n-octyl group, t-octyl group, n-decyl group, and n-octadecyl group) or an aryl group (such as phenyl group, benzyl group, and α, α-dimethylbenzyl group).

$R^5$ and $R^6$ in the general formula (b) are organic residues each containing an aromatic nucleus. Herein organic residues containing aromatic nucleus include various ones such as 3-(o-hydroxyphenyl)propyl group, 2-(p-hydroxyphenyl)ethyl group and groups represented by the formula:

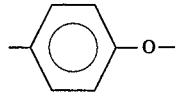

and the formula:

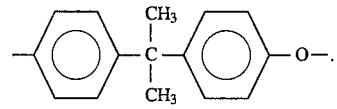

The PC-PDMS copolymer as component (A) can be obtained by reacting, for example, an organic dihydroxy compound represented by the general formula (c):

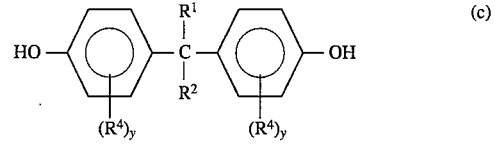

(wherein $R^1$, $R^2$, $R^4$ and y are as defined above), a polydimethylsiloxane represented by the general formula (d):

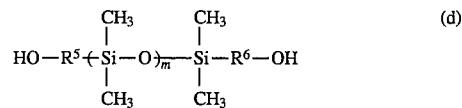

(wherein $R^5$, $R^6$ and m are as defined above), and a carbonic ester-forming derivative in a liquid medium in the presence of a molecular weight modifier.

Herein organic dihydroxy compounds represented by the general formula (c) include various ones such as bis(4-hydroxyphenyl)alkane. More specifically, they include bisphenols such as 2,2-bis(4-hydroxyphenyl)propane [commonly called bisphenol A], bis(4-hydroxyphenyl)methane, 1,1,-bis(4-hydroxyphenyl)ethane, 1,1-bis(4-hydroxyphenyl)propane, 2,2 -bis(4-hydroxyphenyl)butane, 2,2-bis(4 -hydroxyphenyl)pentane, 2,2-bis(4-hydroxyphenyl)isopentane, 2,2-bis(4-hydroxyphenyl)hexane, 2,2-bis(4-hydroxyphenyl)isohexane, 4,4 -dihydroxytriphenylmethane, 4,4-dihydroxytetraphenylmethane, 1,1-bis(4-hydroxyphenyl)cyclohexane, 2,2-bis(4,4-hydroxy-3-methylphenyl)propane, and 2,2-bis(4,4-hydroxy-3,5-dimethylphenyl)propane.

Polydimethylsiloxanes represented by the general formula (d) can be prepared as follows. Octamethylcyclotetrasiloxane and disiloxane, for instance, are reacted to form a polydimethylsiloxane having hydrogens at the terminals, which is reacted with arylphenyl. Thus polydimethylsiloxane having phenol groups at the terminals can be prepared. Therein the repeating number of dimethylsilanoxy units can be controlled by the ratio by volume of octamethylcyclotetrasiloxane and disiloxane. The above process for production is shown by the following reaction formulae.

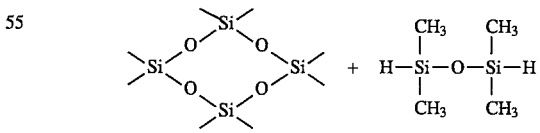

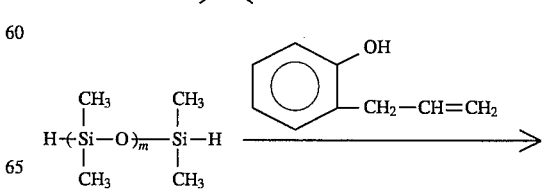

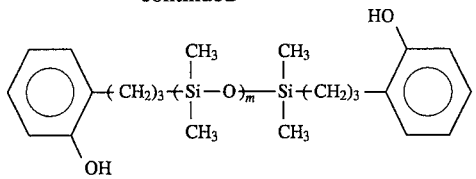

The repeating number of dimethylsilanoxy unit m should be not less than 100. If m is less than 100, when, for example, the resulting product is blended with glass fiber as a filler, the Izod impact resistance of the resulting composition is insufficient. If m is in excess of 400, such a polydimethylsiloxane is difficult to prepare, and is not practical.

After the completion of the reaction, vacuum distillation is desirably conducted to remove the low boiling point components (mainly dimer or trimer). Conditions for the vacuum distillation are not limited particularly, but distillation is conducted at 100° to 200° C. under 10 or less Torr (about 1 to 200 minutes) until low boiling point component is not distilled out.

As the carbonic ester-forming derivative, phosgene is usually used, but in addition to said phosgene, various compounds such as bromophosgene, diphenyl carbonate, di-p-tolyl carbonate, phenyl-p-tolyl carbonate, di-p-chlorophenyl carbonate, and dinaphtyl carbonate, and moreover, a polycarbonate oligomer comprising such a compound and an organic dihydroxy compound mentioned before can also be used.

In the present invention, when PC-PDMS copolymer is produced from an organic dihydroxy compound, polydimethylsiloxane, and carbonic ester-forming derivative as mentioned above, a molecular weight modifier should exist in the reaction system. Therein various molecular weight modifiers can be used. Specific examples of the molecular weight modifiers are pentahalogenophenol (such as pentabromophenol, pentachlorophenol, pentafluorophenol), trihalogenophenol (such as tribromophenol, trichlorophenol, and trifluorophenol), phenol, p-cresol, p-tert-butylphenol, p-tert-octylphenol, and p-cumylphenol.

The amount of the organic dihydroxy compound to be placed in may be selected properly depending on the polymerization degree of polycarbonate block to be produced. On the other hand, since the amounts of the molecular weight modifier and the carbonic ester-forming derivative to be introduced define the polymerization degree of polycarbonate block, these amounts should be selected according to the purpose. The specific amount of molecular weight modifier to be introduced may be selected around an amount enough to be combined with the terminal (particularly both the terminals) of the resulting polycarbonate or an amount somewhat larger than the same.

Polydimethylsiloxane is preferably contained so as to exist in a proportion of 0.5 to 10% by weight, particularly 1 to 10% by weight in the copolymer. If the proportion is less than 0.5% by weight, the Izod impact resistance of the resulting polycarbonate is insufficient when it is blended with glass fiber used as the filler, for instance. However, if the proportion is in excess of 10% by weight, the heat distortion temperature of the resulting polycarbonate will be low.

The PC-PDMS copolymer to be used in the present invention can be produced by conducting the reaction in an aqueous medium. Specifically, the reaction may proceed in accordance with the interface polymerization method, the pyridine method and the like which are conventionally known.

The copolymer comprising a PC block represented by the general formula (a) and a PDMS block represented by the general formula (b) which are obtained as above has a viscosity average molecular weight of 10,000 to 50,000, preferably 12,000 to 30,000. If viscosity average molecular weight is less than 10,000, the Izod impact strength of the copolymer is too low to comply with the object of the present invention. However, copolymers of which viscosity average molecular weight is in excess of 50,000 have difficulty in their production process.

In the PC-PDMS copolymer of the present invention, n-hexane soluble content is 1.0% by weight or smaller. Therein if n-hexane soluble content is in excess of 1.0% by weight, when the copolymer is blended with an inorganic filler such as a glass fiber, the Izod impact resistance is not so improved. Particularly, in order to increase the effect of improvement in the Izod impact resistance when the copolymer is blended with a glass fiber and the like, a PC-PDMS copolymer having a crystallization degree of 30% or higher is preferable.

In order to produce said PC-PDMS copolymer having a n-hexane soluble content of 1.0% by weight or smaller, for example, the copolymerization reaction as mentioned above should be conducted while controlling the PDMS content in the copolymer to 10% by weight or smaller, and with the use of PDMS having 100 or more of the dimethylsilanoxy repeating unit, and with the use of $5.3 \times 10^{-3}$ mol/kg. oligomer or more of a catalyst such as a tertiary amine.

Component (B) to be used in the present invention comprises at least one selected from the group of thermoplastic resin and rubber-like elastomer. The thermoplastic resin includes a a thermoplastic crystalline resin, thermoplastic amorphous resin and a fluorine resin.

The thermoplastic crystalline resin, one of Component (B) to be used in the present invention includes a polyester resin, a polyamide resin, and a polyolefin resin.

As the polyester resin therein, various ones can be used, but a polyester resin obtained by the polycondensation of a bifunctional carboxylic acid component and an alkylene glycol component is preferably used. Suitable examples of these polyester resins are polyethylene terephthalate (PET), and polybutylene terephthalate (PBT).

Said polyester resins can be produced by a usual method in the presence or absence of a polycondensation catalyst which contains titanium, germanium, antimony or the like. For example, polyethylene terephthalate is produced by a so-called two-step polymerization reaction. Said two-step polymerization reaction comprises the first step reaction in which terephthalic acid and ethylene glycol are esterified, or a lower alkyl ester of terephthalic acid such as dimethylterephthalate and ethylene glycol are esterified to produce the glycol ester of terephthalic acid and/or the low polymer thereof; and the second step reaction in which said glycol ester and/or its low polymer are further polymerized to produce a polymer of higher polymerization degree.

The bifunctional carboxylic acid component and alkylene glycol component to be used in the above reaction are as follows. Examples of a bifunctional carboxylic acid component are aromatic carboxylic acid such as terephthalic acid, isophthalic acid, and naphthalene dicarboxylic acid. Among these, terephthalic acid is preferable, and other bifunctional carboxylic acid components can be used in combination so far as the effect of the present invention is not impaired. Further examples of the bifunctional carboxylic acid are aliphatic dicarboxylic acid such as oxalic acid, malonic acid, adipic acid, suberic acid, azelaic acid, sebacic acid and decanedicarboxylic acid, and ester forming derivatives thereof. A preferable proportion of these dicarboxylic acid components other than terephthalic acid is usually within 20 mol % of the total dicarboxylic acid.

As the above-mentioned alkylene glycol component, for example, aliphatic diols containing 2 to 15 carbon atoms, such as ethylene glycol, propylene-1,2-glycol, propylene 1,3-glycol, butylene-1,4-glycol, butylene-2,3-glycol, hexane-1,6-diol, octane-1,8-diol, neobentyl glycol and decane 1,10-diol can be used. Among these, ethylene glycol, and butylene glycol are suitable.

Various polyamide resins can be used there. For example, all of the open-ring polymer of lactam, polycondensate of diamine and dibasic acid, and polycondensate of ω-amino acid can be used, and also mixtures of these polymers, and copolymers thereof can be used. Specific example of them are Nylon-6 (PA6), Nylon-4. 6, Nylon-6. 6, Nylon-6. 10, Nylon-6. 12, Nylon-11, Nylon-12, and Nylon-6/6. 6 copolymer.

Further, examples of polyolefin resins to be used therein are homopolymers of olefin such as α-olefin, including ethylene, propylene, butene-1, isobutylene, pentene-1, 3-methylbutene-1, 4-methylpentene-1, hexene-1, and octene; copolymers of two or more these olefins; and copolymers of olefin with a vinyl compound, unsaturated carboxylic acid, unsaturated carboxylic acid ester or the like comprising 70 mol % or more, preferably 80 mol % or more of olefin, for example, copolymers of an olefin with a vinyl compound including vinyl esters such as vinyl acetate or vinyl halide such as vinyl chloride, copolymers of olefin with unsaturated carboxylic acid such as acrylic acid, methacrylic acid, and maleic acid, or copolymers of olefin with unsaturated carboxylic acid ester such as methyl acrylate, ethyl acrylate, methyl methacrylate, and ethyl methacrylate. Specific examples of them are low density polyethylene, linear low density polyethylene, high density polyethylene (HDPE), isotactic polypropylene, atactic polypropylene, an ethylene-propylene copolymer, an ethylene-vinyl acetate copolymer, or a saponified product thereof, an ethylene-methyl acrylate copolymer, ethylene-ethylacrylate copolymer, and ethylene-methyl methacrylate copolymer.

In the composition of the present invention, the proportions of Component (A) and Component (B), when thermoplastic crystalline resin is used as Component (B), are usually 1 to 99% by weight and 99 to 1% by weight, respectively. More preferably, 30 to 95% by weight of Component (A) and 70 to 5% by weight of Component (B) are blended. If Component (A) is less than 1% by weight, the original impact resistance of PC-PDMS copolymer does not reveal sufficiently, while if it is in excess of 99% by weight, no improvement in fluidity and solvent resistance are obtained.

As the thermoplastic crystalline resin, one of Component (B), various ones including styrene-based resin can be used. Examples of the styrene-based resins are general purpose polystyrene resin (GPPS), high impact resistant polystyrene resin (HIPS), styrene-maleic acid anhydride copolymer (SMA), and acrylonitrile-butadiene-styrene resin (ABS).

Specific examples of the above-mentioned high resistant polystyrene resin are a polymer containing a soft component in dispersed form, obtained by dissolving or mixing a rubber-like elastomer in or with a monovinyl aromatic monomer, and then polymerizing them. As the rubber-like elastomer, polybutadiene is particularly preferred. In addition, styrene-butadiene-styrene (SBS) resin, acrylonitrile-styrene-butadiene (ASB) resin, styrene-butadiene copolymer rubber (SBR), butadiene-acryl rubber, isoprene rubber, isoprene-styrene rubber, isoprene-acryl rubber, and ethylene-propylene rubber are also preferred. The polybutadiene to be used herein may be any of low cis-polybutadine (for example, those containing 1 to 30 mol % of 1,2-vinyl bond, and 30 to 42 mol % of 1,4-cis bond), high cis polybutadine (for example, those containing less than 20 mol % of 1,2-vinyl bond, and 78 mol % or more of 1,4-cis bond), or may be a mixture thereof.

In the above-mentioned styrene-maleic anhydride copolymer, the ratio of the two components can vary in a wide range, and so is molecular weight. A styrene maleic anhydride copolymer can generally be produced by reacting maleic anhydride and styrene in the presence of peroxide catalyst while the temperature is elevated (see the specifications of U.S. Pat. Nos. 2,866,771 and 2,971,939). Said copolymer may contain, in place of styrene itself, α-methylstyrene, vinyltoluene, 2,4-dimethylstyrene, chlorostyrene or other substituted styrenes. The molecular weight of the styrene-maleic anhydride copolymer can be selected from a wide range. It can vary, for example, in the range of 20,000 to 300,000, preferably approximately 80,000 to 200,000. The styrene/maleic anhydride copolymer preferably contains for instance 5 to 50% by weight, more preferably 5 to 30% by weight, still more preferably 8 to 15% by weight of maleic anhydride. Therein rubber-modified styrene-maleic anhydride copolymer can be used. Said rubber-modified styrene/maleic anhydride copolymer is obtained by thermal polymerization of styrene monomer and maleic anhydride using a rubber component in the presence of a chain-transfer agent, and a radical generator.

Typical examples of the rubber components are, for example, butadiene rubber, butadiene-styrene rubber or butadiene-acrylic rubber containing 60 to 95% by weight of butadiene, isoprene rubber, isoprene-styrene rubber or isoprene-acrylic rubber containing 60 to 95% by weight of isoprene, A-B type block rubber or A-B-A type block rubber of butadiene-styrene containing 50 to 95% by weight of butadiene, and ethylene-propylene copolymer rubber (EPT). These can be used as mixture of two kinds.

The rubber component as above is preferably contained in a proportion of 2 to 25% by weight, preferably 5 to 12% by weight in the rubber-modified copolymer obtained finally.

In the above ABS resin, as the rubber-like polymer to be used for producing a graft copolymer, polybutadiene or butadiene copolymer is used alone or as a mixture. Herein, as the butadiene copolymer, copolymers of butadiene and vinyl monomer (such as styrene, and acrylonitrile). Said vinyl monomers to be graft-polymerized on rubber-like polymer are mixtures of two or more monomers selected from the group of aromatic vinyl monomer, vinyl cyanide monomer and methacrylic ester monomer. Aromatic vinyl monomers therein include, for example, styrene, vinyltoluene, vinylxylene, halogenated styrene; vinyl cyanide monomers include acrylonitrile, and methacrylonitrile; and methacrylate monomers include methyl methacrylate, ethyl methacrylate, propyl methacrylate, and butyl methacrylate.

These monomers often are used as mixtures of two kinds or more. Preferable combinations of them are, for example, styrene and acrylonitrile, styrene and methyl methacrylate, styrene and mixture of acrylonitrile and methyl methacrylate.

In the composition of the present invention shown as above, when a thermoplastic amorphous resin is used as Component (B), usually 1 to 99% by weight of Component (A) and 99 to 1% by weight of Component (B) are blended. Preferable proportions of Component (A) and Component (B) are 30 to 95% by weight, and 70 to 5% by weight, respectively. If the proportion of Component (A) is less than 1% by weight, the impact resistance originally belongs to PC-PDMS copolymer does not reveal sufficiently, and if it is in excess of 99% by weight, fluidity of the resulting composition is poor. If the proportion of Component (B) is less than 1% by weight, the resulting composition is not improved in fluidity, and if it is in excess of 99% by weight, the impact strength of the composition are poor.

As the fluorine resin to be used as Component (B) of the present invention, any resin that contains a fluorine atom in the molecule thereof can be used. Particularly, resins having a C—F bond in the molecule thereof, such as polytetrafluoroethylene, polychlorofluoroethylene, polychlorotrifluoroethylene, polyvinyl fluoride, polyvinylidene fluoride, a hexafluoropropylenetetrafluoroethylene copolymer, and a chlorotrifluoroethylene/vinylidene fluoride copolymer are preferred, and among them polytetrafluoroethylene having a melting point of 300° to 350° C. is particularly preferred.

In the composition of the present invention shown above, when fluorine resin is used as Component (B), 60 to 99% by weight of Component (A) and 40 to 1% by weight of Component (B) are usually blended. Preferably, 65 to 95% by weight of Component (A) and 35 to 5% by weight of Component (B) are blended. If the proportion of Component (A) is less than 60% by weight, the original impact resistance of PC-PDMS copolymer does not reveal sufficiently, and if it is in excess of 99% by weight, the resulting composition is not so improved in wear resistance or sliding characteristics. If the proportion of Component (B) is less than 1% by weight, the resulting composition is not improved in wear resistance or sliding characteristics, and if it is in excess of 40% by weight, the appearance of the molding product is poor.

Further, rubber-like elastomers to be used as one of Component (B)s of the present invention include natural rubber, synthetic rubber, and graft copolymers.

The rubber-like elastomer used there is not particularly limited. For example, natural rubber (NR); diene-based rubber such as styrene-butadiene rubber (SBR), butyl rubber (BR), isoprene rubber (IR), nitrile-butadiene rubber (NBR), nitrile-isoprene rubber (NIR), and chloroprene rubber (CR); olefin-based rubber such as isobutylene-isoprene rubber (IIR), ethylene-propylene rubber (EPM), ethylene-propylene-diene rubber (EPDM), chlorosulfonated polyethylene rubber (CSM), halogenated butyl rubber, styrene-butadiene block copolymer rubber, styrene-isoprene block copolymer rubber, rubber-like chlorosulfonated polyethylene (CSM), rubber-like chlorinated polyethylene (CPE), acrylic rubber, copolymer of alkyl acrylate and 2-chloroethyl vinyl ether (ACM), copolymer of alkyl acrylate and acrylonitrile (ANM), urethane rubber (thermoplastic type), silicone rubber, fluorine rubber, polyester-polyether-polyester block copolymer rubber, epichlorohydrin rubber, and ethylene-vinyl acetate rubber (EVM); various acrylic rubber; and organic silicone compounds, organic fluorine compound-based rubber, urethane-based rubbers, and ether-based rubbers can be used. Further, a MAS resin (graft copolymer of 60 to 80% by weight of n-butyl acrylate, and styrene and methyl methacrylate), MABS resin (copolymer obtained by copolymerizing octyl acrylate and butadiene in a weight ratio of 7:3 to form a rubber latex, and graft polymerizing styrene and methyl methacrylate onto the rubber latex), MBS resin (copolymer obtained by copolymerization of methyl methacrylate and butadiene to form a rubber latex, and then graft polymerizing styrene onto the rubber latex) and the like are mentioned.

In the composition of the present invention shown above, when a rubber-like elastomer is used as Component (B), usually 40 to 99% by weight of Component (A) and 60 to 1% by weight of Component (B) are blended. Preferably, 50 to 95% by weight of Component (A) and 50 to 5% by weight of Component (B) are blended. If the proportion of Component (A) is less than 40% by weight, impact resistance inherent to PC-PDMS copolymer does not reveal sufficiently, and if it is in excess of 99% by weight, fluidity of the resulting composition is lowered. If the proportion of Component (B) is less than 1% by weight, the resulting composition is not improved in fluidity, and if it is in excess of 60 by weight, strength and elasticity of the composition are lowered.

In the polycarbonate resin composition of the present invention, various inorganic fillers, additives or other synthetic resins, elastomers and the like can be blended if necessary, so far as the object of the present invention is not impaired.

Examples of above-mentioned inorganic fillers to be blended to increase the mechanical strength, durability or volume of the polycarbonate resin composition are glass fiber (GF), glass beads, glass flake, carbon black, calcium sulfate, calcium carbonate, calcium silicate, titanium oxide, alumina, silica, asbestos, talc, clay, mica, and quartz powder. Examples of the additives are antioxidants including hindered phenol-based ones, phosphorous (such as phosphorous ester and phosphoric ester)-based ones, ultraviolet ray absorbers including benzotriazole-based, and benzophenone-based ones; external lubricants such as aliphatic carboxylate, and paraffin based ones; usual flame retardants; releasing agents; antistatic agents; coloring agents and the like. As the above hindered phenol-based antioxidant, BHT (2,6-di-tertiary-butyl-p-cresol), IRGANOX 1076 and IRGANOX 1010 (trade names, both produced by Ciba Geigy Corporation), ETHYL 330 (trade name, produced by Ethyl Corporation), and SUMILIZER GM (trade name, produced by Sumitomo Chemical Co., Ltd.) are preferably used.

The polycarbonate resin composition of the present invention can be obtained by blending and kneading the above-mentioned components. Blending and kneading can be conducted by the conventional methods by the use of a ribbon blender, a Henschel mixer, a Bumbary mixer, a drum tumbler, a single screw extruder, a twin screw extruder, a cokneader, and multi-screw extruder, for instance. The preferable temperature at kneading is usually 250° to 300° C.

The polycarbonate resin composition thus obtained can be molded by various conventional molding methods such as injection molding, extrusion molding, compression molding, calender molding, and rotary molding to produce moldings for cars such as bumpers, and moldings for home electric appliances.

The polycarbonate resin composition of the present invention is excellent in solvent resistance and fluidity (flow value is large) as well as impact resistance, and suitable for interior material and exterior material particularly for cars. In the field of office automation apparatus, it is suitable for chassis and housing material. Further, particularly it is suited for sliding part of gears and toothed wheels.

The present invention will be described in greater detail with reference to the following examples.

Preparation Example 1

(Preparation of PDMS with phenol groups at terminals)

1483 g of octamethylcyclotetrasiloxane and 18.1 g of 1,1,3,3-tetramethyldisiloxane, and 35 g of 86% sulfuric acid were mixed, and stirred for 17 hours at room temperature. Subsequently, the oil phase was separated, and 25 g of sodium hydrogencarbonate was added, and the mixture was stirred for 1 hour. After filtration, the mixture was vacuum distilled at 150° C. under 3 torr, and low boiling point matters were removed.

To the mixture of 60 g of 2-allylphenol and 0.0014 g of platinum chloride-alcoholate complex, 294 g of the oil obtained as above was added at a temperature of 90° C. The resulting mixture was stirred for 3 hours while kept in the temperature range of 90° to 115° C. The resulting product was extracted with methylene chloride, washed three times with 80% aqueous methanol to remove excessive 2-allylphenol. The residue was dried with anhydrous sodium sulfate, and the solvent was distilled away under vacuum up to a temperature of 115° C.

Determination by nuclear magnetic resonance (NMR) showed that the repeating number of dimethylsilanoxy unit of the PDMS with phenol groups at terminals obtained was 150.

Preparation Example 2

(Preparation of Polycarbonate Oligomer of Bisphenol A)

Into 400 l of 5% aqueous solution of sodium hydroxide, 60 kg of bisphenol A was dissolved to prepare an aqueous solution of sodium hydroxide of bisphenol A. Subsequently, said aqueous solution of sodium hydroxide kept at room temperature was introduced at a flow rate of 138 l/hour, and methylene chloride was introduced at a flow rate of 69 l/hour into a tubular reactor having an inner diameter of 10 mm and a tube length of 10 m by way of an orifice plate, and phosgene was blown into the above as a parallel stream at a flow rate of 10.7 kg/hour, and continuously reacted for 3 hours.

The tubular reactor used here had double tubes, and cooling water was flowed in the jacket part to keep the reaction solution at an exhaustion temperature of 25° C. The exhausted solution was adjusted to a pH of 10 to 11. After the reaction solution thus obtained was allowed to stand still, the aqueous phase was separated and removed, and methylene chloride phase (220 l) was taken up. To the methylene chloride, further 170 l of methylene chloride was added and fully stirred. The resulting mixture was polycarbonate oligomer (concentration: 317 g/l). The polymerization degree of the polycarbonate oligomer obtained therein was 3 to 4.

Preparation Examples 3 to 5

91 g of reactive PDMS obtained by Preparation Example 1 was dissolved into 2 l of methylene chloride to be mixed with 10 l of PC oligomer obtained in Preparation Example 2. Thereto, a solution obtained by dissolving 26 g of sodium hydroxide in 1 l of water, and b (cc) of triethyl amine (TEA) were added and stirred at 500 rpm for 1 hour at room temperature. Then, a solution obtained by dissolving 600 g of bisphenol A into 5 l of 5.2% by weight aqueous solution of sodium hydroxide, and 8 l of methylene chloride and a (g) of p-tert-butylphenol (PTBP) were added further, and the resulting mixture was stirred at 500 rpm at room temperature for 2 hours. After that, 5 l of methylene chloride was added further, and the mixture was washed with 5 l of water, alkali washed with 5 l of 0.01N aqueous solution of sodium hydroxide, acid washed with 5 l of 0.1N chloric acid, and washed with 5 l of water in turn, and lastly methylene chloride was removed to obtain PC-PDMS copolymer in chipped form. The PC-PDMS copolymer obtained was tested for its properties under the following conditions.

Determination of PDMS content and PDMS chain length (dimethylsilanoxy unit)

PDMS content was found by the intention ratio of the peak ascribable to methyl group in the isopropyl of bisphenol A observed at 1.7 ppm, and the peak ascribable to methyl group in dimethylsiloxane observed at 0.2 ppm of $^1$HNMR.

The chain length of PDMS was found by the intention ratio of the peak ascribable to methyl group in dimethylsiloxane observed at 0.2 ppm and the peak ascribable to the methylene group of PC-PDMS bond observed at 2.6 ppm by $^1$HNMR.

Determination of n-hexane soluble content

It is a component extracted by Soxhlet extraction method with n-hexane as the solvent. Specifically, 15 g of chipped copolymer as sample was taken on cylindrical filter paper No. 84 (28×100 mm), and extracted by reflux for 8 hours in a reflux amount of once per 3 to 4 minutes (20 ml/time) by the use of 300 ml of n-hexane. After that, 300 ml of n-hexane was evaporated, and the residue was weighed and regarded as n-hexane soluble content.

The result is shown in Table 1.

Examples 1 to 11 and Comparative Examples 1 to 10

Prescribed amounts of PC-PDMS copolymer and thermoplastic crystalline resin shown in Tables 2 and 3 were premixed by a drum tumbler, then supplied to an extruder, kneaded at a temperature of 280° C. to obtain a polycarbonate resin composition. The composition was then pelletized.

Further, resulting pellet was injection-molded at a cylinder temperature of 280° C., and at a mold temperature of 80° C. to obtain a test piece.

The test piece was determined for Izod impact strength, tensile strength, solvent resistance, and the flow value of pellet. The results are shown in Tables 2 and 3.

Notes in Table 2 are as follows.

*1 PC-PDMS copolymer of Preparation Example 3

*2 PC-PDMS copolymer of Preparation Example 4

*3 Dianite MA-523, produced by Mitsubishi Rayon Co., Ltd.

*4 Toughpet N1000, produced by Mitsubishi Rayon Co., Ltd.

*5 Ube Nylon 1013, produced by Ube Industries, Ltd.

*6 Ube Nylon 2020, produced by Ube Industries, Ltd.

*7 Idemitsu Polyethylene 640UF, produced by Idemitsu Petrochemical Co., Ltd.

*8 Idemitsu Polypro J-465H, produced by Idemitsu Petroleum Co., Ltd.

*9 03MA409C (length: 3 mm, diameter: 13 μm), produced by Asahi Fiber Grass Co., Ltd.

*10 Flow Value at 280° C., Load: 160 kg

*a Percentage based on the total amount of PC-PDMS copolymer and thermoplastic crystalline resin

*b Proportion to the total amount of PC-PDMS copolymer and thermoplastic crystalline resin as 100 part by weight

TABLE 1

| No. | PTBP a(g) | TEA b(cc) | Viscosity average molecular weight (× 10⁴) | Chain length of PDMS (m) | PDMS content (wt %) | n-hexane soluble content (wt %) |
|---|---|---|---|---|---|---|
| Preparation Example 3 | 119 | 5.7 | 1.5 | 150 | 2 | 0.4 |
| Preparation Example 4 | 81 | 5.7 | 2.0 | 150 | 2 | 0.3 |
| Preparation Example 5 | 119 | 1.2 | 1.5 | 150 | 2 | 1.4 |

15

TABLE 2

| No. | PC-PDMS copolymer | | Thermoplastic crystalline Resin | | Other Additives | |
|---|---|---|---|---|---|---|
| | Kind | Amount*a (wt %) | Kind | Amount*a (wt %) | Kind | Amount*b (part by weight) |
| Example 1 | I*1 | 90 | PET*3 | 10 | — | — |
| Example 2 | I | 70 | PET | 30 | — | — |
| Example 3 | I | 50 | PET | 50 | — | — |
| Example 4 | II*2 | 70 | PET | 30 | — | — |
| Example 5 | I | 80 | PBT*4 | 20 | — | — |
| Example 6 | I | 60 | PBT | 40 | — | — |
| Example 7 | II | 70 | PBT | 30 | — | — |
| Example 8 | I | 70 | PET | 30 | GF*9 | 10 |
| Example 9 | I | 90 | PA6*5 | 10 | — | — |
| Example 10 | I | 90 | PA66*6 | 10 | — | — |
| Example 11 | I | 90 | HDPE*7 | 10 | — | — |
| Example 12 | II | 90 | HDPE | 10 | — | — |
| Example 13 | I | 80 | PP*8 | 20 | — | — |

| | Result of Evaluation | | | | |
|---|---|---|---|---|---|
| | Izod Impact Strength (kg · cm/cm) | | Tensile Strength | Solvent Resistance (Critical Strain) | Flow Value*10 |
| No. | (23° C.) | (−30° C.) | (kg/cm²) | (%) | (ml/sec) |
| Example 1 | 75 | 30 | 630 | 0.3 | $50 \times 10^{-2}$ |
| Example 2 | 65 | 25 | 610 | 0.5 | $60 \times 10^{-2}$ |
| Example 3 | 15 | 14 | 600 | 0.6 | $70 \times 10^{-2}$ |
| Example 4 | 85 | 30 | 640 | 0.6 | $10 \times 10^{-2}$ |
| Example 5 | 65 | 25 | 650 | 0.4 | $70 \times 10^{-2}$ |
| Example 6 | 20 | 15 | 650 | 0.6 | $85 \times 10^{-2}$ |
| Example 7 | 30 | 20 | 670 | 0.6 | $14 \times 10^{-2}$ |
| Example 8 | 18 | 12 | 1100 | 0.45 | $50 \times 10^{-2}$ |
| Example 9 | 6 | 4 | 680 | 0.35 | — |
| Example 10 | 6 | 4 | 650 | 0.35 | — |
| Example 11 | 55 | 30 | 550 | 0.70 | $70 \times 10^{-2}$ |
| Example 12 | 65 | 35 | 570 | 0.80 | $8 \times 10^{-2}$ |
| Example 13 | 40 | 15 | 250 | 2.5 | $140 \times 10^{-2}$ |

TABLE 3

| No. | PC or PC-PDMS copolymer | | Thermoplastic Crystalline Resin | | Other Additives | |
|---|---|---|---|---|---|---|
| | Kind | Amount (wt %) | Kind | Amount (wt %) | Kind | Amount*b (Part by weight) |
| Comparative Example 1 | III*11 | 90 | PET | 10 | — | — |
| Comparative Example 2 | III | 70 | PET | 30 | — | — |
| Comparative | III | 50 | PET | 50 | — | — |

TABLE 3-continued

| | | | | | | |
|---|---|---|---|---|---|---|
| Example 3 | | | | | | |
| Comparative Example 4 | III | 80 | PBT | 20 | — | — |
| Comparative Example 5 | III | 60 | PBT | 40 | — | — |
| Comparative Example 6 | III | 70 | PET | 30 | GF | 10 |
| Comparative Example 7 | III | 90 | PA6 | 10 | — | — |
| Comparative Example 8 | III | 90 | HDPE | 10 | — | — |
| Comparative Example 9 | IV*[12] | 70 | PET | 30 | — | — |
| Comparative Example 10 | IV | 80 | PBT | 20 | — | — |

*[11]Toughlon A2200 (molecular weight: 22,000)
Polycarbonate (PC) produced by Idemitsu Petrochemical Co., Ltd.
*[12]PC-PDMS copolymer of Preparation Example 5.
(n-hexane soluble content: 1.4% by weight)

Result of Evaluation

| No. | Izod Impact Strength (kg · cm/cm) | | Tensile Strength (kg/cm$^2$) | Solvent Resistance (Critical Strain) (%) | Flow Value*[13] (ml/sec) |
|---|---|---|---|---|---|
| | (23° C.) | (−30° C.) | | | |
| Comparative Example 1 | 85 | 20 | 630 | 0.3 | $8 \times 10^{-2}$ |
| Comparative Example 2 | 75 | 15 | 600 | 0.5 | $10 \times 10^{-2}$ |
| Comparative Example 3 | 15 | 10 | 590 | 0.6 | $12 \times 10^{-2}$ |
| Comparative Example 4 | 75 | 15 | 640 | 0.4 | $12 \times 10^{-2}$ |
| Comparative Example 5 | 15 | 10 | 650 | 0.6 | $16 \times 10^{-2}$ |
| Comparative Example 6 | 10 | 8 | 1070 | 0.45 | $8 \times 10^{-2}$ |
| Comparative Example 7 | 4 | 2 | 660 | 0.35 | — |
| Comparative Example 8 | 55 | 20 | 550 | 0.70 | $8 \times 10^{-2}$ |
| Comparative Example 9 | 75 | 18 | 610 | 0.5 | $60 \times 10^{-2}$ |
| Comparative Example 10 | 75 | 18 | 650 | 0.4 | $70 \times 10^{-2}$ |

*[13]Flow Value at 28° C., Load: 160 kg

Examples 12 to 21 and Comparative Examples 11 to 19

Prescribed amounts of PC-PDMS copolymer and thermoplastic amorphous resin shown in Tables 4 and 5 were premixed by a drum tumbler, then supplied to an extruder and kneaded at 260° C. to obtain a polycarbonate resin composition, which was pelletized.

The pellet obtained was injection molded at a cylinder temperature of 260° C. and at a mold temperature of 80° C. to obtain a test piece.

The test piece was determined for Izod impact strength, tensile strength, solvent resistance and flow value of the pellet. The results are shown in Tables 4 and 5.

Notes in Table 4 are as follows.

*1 PC-PDMS in Preparation Example 3

*2 PC-PDMS in Preparation Example 4

*3 ABS resin comprising 28 parts by weight of butadiene, 24 parts by weight of acrylonitrile, and 48 parts by weight of styrene

*4 Impact-resistant styrene/maleic anhydride copolymer (DYLARK D250, produced by Atlantic Richfield Co., Ltd., U.S.A.)

*5 General purpose styrene/maleic anhydride copolymer (MOREMAX UG430, produced by Idemitsu Petrochemical Co., Ltd.)

*6 General purpose polystyrene (Idemitsu Styrol HH30, produced by Idemitsu Petrochemical Co., Ltd.)

*7 Impact resistant polystyrene (Idemitsu Styrol HT52, produced by Idemitsu Petrochemical Co., Ltd.)

*8 03MA409C (length: 3 mm, diameter: 13 μ), produced by Asahi Fiber Glass Co., Ltd.

*9 Flow value: 260° C., Load: 100 kg

*a Percentage based on the total amount of PC-PDMS copolymer and thermoplastic amorphous resin

*b Proportion to the total amount of PC-PDMS copolymer and thermoplastic amorphous resin as 100 parts by weight

TABLE 4

| No. | PC-PDMS copolymer Kind | Amount*a (wt %) | Thermoplastic Amorphous Resin Kind | Amount*a (wt %) | Other Additives Kind | Amount*b (Part by weight) |
|---|---|---|---|---|---|---|
| Example 12 | I*1 | 50 | ABS*3 | 50 | — | — |
| Example 13 | I | 70 | ABS | 30 | — | — |
| Example 14 | II*2 | 50 | ABS | 50 | — | — |
| Example 15 | I | 60 | HISMA*4 | 40 | — | — |
| Example 16 | I | 40 | HISMA | 60 | — | — |
| Example 17 | II | 80 | GPSMA*5 | 20 | — | — |
| Example 18 | I | 90 | GPPS*6 | 10 | — | — |
| Example 19 | II | 90 | HIPS*7 | 10 | — | — |
| Example 20 | I | 70 | ABS | 30 | GF*8 | 10 |
| Example 21 | I | 60 | HISMA | 40 | GF | 10 |

| | Result of Evaluation | | | | |
|---|---|---|---|---|---|
| | Izod Impact Strength (kg · cm/cm) | | Tensile Strength | Solvent Resistance (Critical Strain) | Flow Value*9 |
| No. | (23° C.) | (−30° C.) | (kg/cm$^2$) | (%) | (ml/sec) |
| Example 12 | 70 | 55 | 520 | 0.22 | $30 \times 10^{-2}$ |
| Example 13 | 75 | 65 | 540 | 0.21 | $20 \times 10^{-2}$ |
| Example 14 | 80 | 75 | 550 | 0.26 | $6 \times 10^{-2}$ |
| Example 15 | 80 | 75 | 520 | 0.22 | $40 \times 10^{-2}$ |
| Example 16 | 55 | 50 | 460 | 0.21 | $60 \times 10^{-2}$ |
| Example 17 | 80 | 30 | 650 | 0.25 | $5 \times 10^{-2}$ |
| Example 18 | 75 | 20 | 630 | 0.20 | $15 \times 10^{-2}$ |
| Example 19 | 85 | 35 | 650 | 0.25 | $3 \times 10^{-2}$ |
| Example 20 | 18 | 12 | 980 | 0.23 | $18 \times 10^{-2}$ |
| Example 21 | 20 | 13 | 930 | 0.24 | $35 \times 10^{-2}$ |

TABLE 5

| No. | PC or PC-PDMS copolymer kind | Amount (wt %) | Thermoplastic Amorphous Resin kind | Amount (wt %) | Other Additives kind | Amount (part by weight) |
|---|---|---|---|---|---|---|
| Comparative Example 11 | III*10 | 50 | ABS | 50 | — | — |
| Comparative Example 12 | III | 70 | ABS | 30 | — | — |
| omparative Example 13 | III | 60 | HISMA | 40 | — | — |
| Comparative Example 14 | III | 80 | GPSMA | 20 | — | — |
| Comparative Example 15 | III | 90 | GPPS | 10 | — | — |
| Comparative Example 16 | III | 90 | HIPS | 10 | — | — |
| Comparative Example 17 | III | 70 | ABS | 30 | GF | 10 |
| Comparative Example 18 | IV*11 | 70 | ABS | 30 | — | — |
| Comparative Example 19 | IV | 60 | HISMA | 40 | — | — |

*10Toughlon A2200 (molecular weight: 22,000)
Polycarbonate (PC) produced by Idemitsu Petrochemical Co., Ltd.
*11PC-PDMS copolymer of Preparation Example 5
(n-hexane soluble content: 1.4% by weight)

| | Result of Evaluation | | | | |
|---|---|---|---|---|---|
| | Izod Impact Strength (kg · cm/cm) | | Tensile Strength | Solvent Resistance (Critical Strain) | Flow Value*12 |
| No. | (23° C.) | (−30° C.) | (kg/cm$^2$) | (%) | (ml/sec) |
| Comparative Example 11 | 70 | 40 | 500 | 0.22 | $6 \times 10^{-2}$ |
| Comparative Example 12 | 75 | 50 | 520 | 0.21 | $4 \times 10^{-2}$ |

TABLE 5-continued

| | | | | | |
|---|---|---|---|---|---|
| Comparative Example 13 | 80 | 60 | 500 | 0.22 | $7 \times 10^{-2}$ |
| Comparative Example 14 | 75 | 15 | 610 | 0.20 | $5 \times 10^{-2}$ |
| Comparative Example 15 | 75 | 10 | 620 | 0.20 | $3 \times 10^{-2}$ |
| Comparative Example 16 | 80 | 20 | 610 | 0.20 | $3 \times 10^{-2}$ |
| Comparative Example 17 | 12 | 8 | 950 | 0.23 | $3.5 \times 10^{-2}$ |
| Comparative Example 18 | 70 | 58 | 530 | 0.21 | $20 \times 10^{-2}$ |
| Comparative Example 19 | 75 | 68 | 510 | 0.22 | $40 \times 10^{-2}$ |

*[12]Flow Value at 260° C., Load: 100 kg

Examples 22 to 26 and Comparative Examples 20 to 26

Prescribed amounts of PC-PDMS copolymer and fluorine resin shown in Tables 6 and 7 were premixed by a drum tumbler, then supplied to an extruder and kneaded at 290° C. to obtain a polycarbonate resin composition, which was pelletized.

The pellet obtained was injection molded at a cylinder temperature of 290° C. and at a mold temperature of 80° C. to obtain a test piece.

The test piece was determined for Izod impact strength and coefficient of kinematic friction. The results are shown in Tables 6 and 7.

Notes in Tables 6 and 7 are as follows.

*1 PC-PDMS in Preparation Example 3

*2 PC-PDMS in Preparation Example 4

*3 Polytetrafluoroethylene (Lubron L5), produced by produced by Daikin Industry Co., Ltd.

*4 03MA409C (length: 3 mm, diameter: 13 μm) produced by Asahi Fiber Glass Co., Ltd.

*a Percentage based on the total amount of PC-PDMS and fluorine resin

*b Proportion to the total amount of PC-PDMS copolymer and fluorine resin as 100 parts by weight

*5 Polycarbonate (Toughlon A2200) (molecular weight: 22,000), produced by Idemitsu Petrochemical Co.

*6 PC-PDMS copolymer of Preparation Example 5 having (n-hexane soluble content: 1.4% by weight)

*7 Not determinable under the same conditions because of melting of friction heat

*8 Poor appearance in Comparative Example 23

TABLE 6

| | PC-PDMS copolymer | | Fluorine Resin | | Other Additives | | Result of Evaluation | | |
|---|---|---|---|---|---|---|---|---|---|
| | | | | | | | Izod Impact Strength (kg · cm/cm) | | Coefficient of Kinematic Friction |
| | Kind | Amount*a (wt %) | Kind | Amount*a (wt %) | Kind | Amount*b (part by weight) | (23° C.) | (−30° C.) | |
| Example 22 | I*1 | 70 | PTFE*3 | 30 | — | — | 16 | 9 | 0.10 |
| Example 23 | II*2 | 80 | PTFE | 20 | — | — | 20 | 10 | 0.16 |
| Example 24 | I | 90 | PTFE | 10 | — | — | 20 | 11 | 0.20 |
| Example 25 | I | 80 | PTFE | 20 | GF*4 | 10 | 13 | 5 | 0.19 |
| Example 26 | II | 70 | PTFE | 30 | GF | 30 | 17 | 7 | 0.35 |

TABLE 7

| | PC-PDMS copolymer | | Fluorine Resin | | Other Additives | | Result of Evaluation | | |
|---|---|---|---|---|---|---|---|---|---|
| | | | | | | | Izod Impact Strength (kg · cm/cm) | | Coefficient of Kinematic Friction |
| | Kind | Amount (wt %) | Kind | Amount (wt %) | Kind | Amount (part by weight) | (23° C.) | (−30° C.) | |
| Comparative Example 20 | III*5 | 100 | PTFE | 0 | — | — | 90 | 15 | —*7 |
| Comparative Example 21 | III | 80 | PTFE | 20 | — | — | 18 | 5 | 0.25 |
| Comparative Example 22 | I | 99.5 | PTFE | 0.5 | — | — | 70 | 10 | 0.40 |
| Comparative Example 23 | II | 55 | PTFE | 45 | — | — | 10 | 3 | 0.12*8 |
| Comparative Example 24 | III | 70 | PTFE | 30 | GF | 30 | 12 | 4 | 0.45 |
| Comparative Example 25 | IV*6 | 70 | PTFE | 30 | — | — | 15 | 5 | 0.20 |
| Comparative Example 26 | IV | 90 | PTFE | 10 | — | — | 20 | 6 | 0.28 |

Examples 27 and 37 and Comparative Examples 27 and 33

Prescribed amounts of PC-PDMS copolymer and rubber-like elastomer shown in Tables 8 and 9 were premixed by a drum tumbler, then supplied to an extruder and kneaded at 280° C. to obtain a polycarbonate resin composition, which was pelletized.

The pellet obtained was injection molded at a cylinder temperature of 280° C. and at a mold temperature of 80° C. to obtain a test piece.

The test piece was determined for Izod impact strength and tensile strength. The results are shown in Tables 8 and 9.

Notes in Tables 8 and 9 are as follows.

*1 PC-PDMS in Preparation Example 3

*2 PC-PDMS in Preparation Example 4

*3 Paraloid KM330 (acrylic rubber), produced by Rohm & Haas Co., Ltd.

*4 HI-BLEN B611 (acrylic rubber) produced by Nippon Zeon Co., Ltd.

*5 Butyl 268 (butylic rubber) produced by Japan Synthetic Rubber Co., Ltd.

*6 03MA409C (length: 3 mm, diameter: 13 μm) produced by Asahi Fiber Glass Co., Ltd.

*a Percentage based on the total amount of PC-PDMS copolymer and rubber-like elastomer

*b Proportions to PC-PDMS copolymer and rubber-like elastomer as 100 parts by weight Notes in Table 9 are as follows.

*7 Toughlon A2200 (molecular weight: 22,000), polycarbonate (PC) produced by Idemitsu Petrochemical Co., Ltd.

*8 PC-PDM copolymer in Preparation Example 5 (n-hexane soluble content: 1.4% by weight)

*a. b The same as above.

TABLE 8

| | PC-PDMS copolymer | | Rubber-like elastomer | | Other Additives | | Result of Evaluation | | |
|---|---|---|---|---|---|---|---|---|---|
| | | | | | | | Izod Impact Strength (kg · cm/cm) | | Tensile Strength (kg/cm²) |
| | Kind | Amount*a (wt %) | Kind | Amount*a (wt %) | Kind | Amount*b (part by weight) | (23° C.) | (−30° C.) | |
| Example 27 | I*1 | 90 | KM330*3 | 10 | — | — | 85 | 65 | 630 |
| Example 28 | I | 80 | KM330 | 20 | — | — | 75 | 65 | 510 |
| Example 29 | I | 90 | B611*4 | 10 | — | — | 85 | 70 | 640 |
| Example 30 | I | 80 | B611 | 20 | — | — | 70 | 60 | 520 |
| Example 31 | I | 95 | butyl 268*5 | 5 | — | — | 60 | 55 | 680 |
| Example 32 | II*2 | 90 | KM330 | 10 | — | — | 90 | 70 | 660 |
| Example 33 | II | 80 | KM330 | 20 | — | — | 80 | 70 | 540 |
| Example 34 | II | 90 | B611 | 10 | — | — | 90 | 75 | 680 |
| Example 35 | II | 80 | B611 | 20 | — | — | 75 | 65 | 560 |
| Example 36 | II | 95 | butyl 268 | 5 | — | — | 65 | 60 | 720 |
| Example 37 | II | 90 | B611 | 10 | GF*6 | 10 | 19 | 10 | 1030 |

TABLE 9

| | PC-PDMS copolymer | | Rubber-like elastomer | | Other Additives | | Result of Evaluation | | Tensile |
| | | | | | | | Izod Impact | | |
| | | Amount*a | | Amount*a | | Amount*b | Strength (kg · cm/cm) | | Strength |
| | Kind | (wt %) | Kind | (wt %) | Kind | (part by weight) | (23° C.) | (−30° C.) | (kg/cm²) |
|---|---|---|---|---|---|---|---|---|---|
| Comparative Example 27 | III*7 | 90 | KM330 | 10 | — | — | 90 | 45 | 630 |
| Comparative Example 28 | III | 80 | KM330 | 20 | — | — | 80 | 50 | 510 |
| Comparative Example 29 | III | 80 | B611 | 20 | — | — | 75 | 50 | 520 |
| Comparative Example 30 | III | 95 | butyl 268 | 5 | — | — | 65 | 45 | 680 |
| Comparative Example 31 | III | 90 | B611 | 10 | GF | 10 | 13 | 7 | 1010 |
| Comparative Example 32 | IV*8 | 80 | KM330 | 20 | — | — | 75 | 55 | 500 |
| Comparative Example 33 | IV | 80 | B611 | 20 | — | — | 60 | 53 | 520 |

The above tests were carried out under the conditions as follows.

Izod impact test was carried out in accordance with JIS K-7110, using pellets with a thickness of ⅛ inch at 23° C. and −30° C.

Tensile fracture strength test was carried out in accordance with JIS K-7113.

Solvent resistance test was carried out using a solvent with critical strain according to the ¼ oval method, and a ratio of volume of toluene/isooctane of 40/60 (in accordance with the method described in Nakatsuji et al., "Shikizai" vol. 39, page 455, 1966)

Flow value was determined in accordance with JIS K-7210 (at 280° C., load: 160 kg or at 260° C., load: 100 kg).

Coefficient of kinematic friction was measured under the conditions; phase pressure of 10 kg/cm2, rate of 20 cm/sec., against soft steel (SS-41).

Industrial Availability

As described above, the polycarbonate resin composition of the present invention can be obtained by blending a PC-PDMS copolymer and at least one selected from the group of thermoplastic resin and rubber-like elastomer. According to the polycarbonate resin composition, moldings excellent in low temperature impact resistance, fluidity, solvent resistance, wear resistance and sliding characteristics can be produced.

Consequently, the polycarbonate resin composition of the present invention is expected to be advantageously used as the materials for moldings which are superior in various physical properties as well as impact resistance.

What is claimed is:

1. A polycarbonate resin composition which comprises (A) a mixture of polycarbonate and a polycarbonate/polydimethylsiloxane copolymer comprising a polycarbonate block of the formula (a):

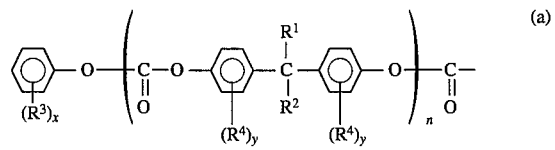

wherein $R^1$ and $R^2$ independently are hydrogen, an alkyl group having 1 to 4 carbon atoms, $R^3$ and $R^4$ independently are a halogen, an alkyl group having 1 to 20 carbon atoms or an aryl group, x is an integer of at most 5, y is an integer of at most 4, and n is an integer of 1 to 100, and a polydimethylsiloxane block of the formula (b):

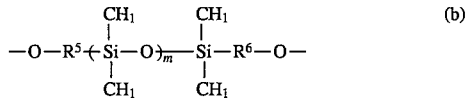

wherein $R^5$ and $R^6$ independently are a 3-(o-hydroxyphenyl)propyl group, a 2-(p-hydroxyphenyl)ethyl group or a group represented by the formula

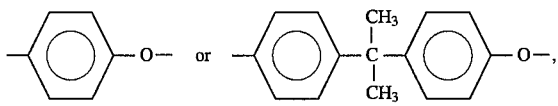

and m is an integer of more than 100, said copolymer mixture having 0.5 to 10% by weight of the polydimethylsiloxane block, 1.0% by weight or less of an n-hexane soluble matter content, and a viscosity average molecular weight of 10,000 to 50,000, and (B) at least one selected from the group consisting of a thermoplastic resin and a rubber elastomer.

2. The polycarbonate resin composition according to claim 1, wherein the thermoplastic resin (B) is a thermoplastic crystalline resin or a thermoplastic amorphous resin.

3. The polycarbonate resin according to claim 2, which comprises (A) 1 to 99% by weight of said mixture and said (B) is a thermoplastic crystalline resin in an amount of 99 to 1% by weight.

4. The polycarbonate resin composition according to claim 3, wherein said (B) is a thermoplastic crystalline resin selected from the group consisting of a polyester resin, a polyamide resin and a polyolefin resin.

5. The polycarbonate resin composition according to claim 2, which comprises (A) 1 to 99% by weight of said mixture and said (B) is a thermoplastic amorphous resin in an amount of 99 to 1% by weight.

6. The polycarbonate resin composition according to claim 5, wherein said (b) is at least one thermoplastic amorphous resin selected from the group consisting of general purpose polystyrene resin, high impact resistant polystyrene resin, styrene-maleic acid anhydride copolymer and acrylonitrile-butadiene-styrene resin.

7. The polycarbonate resin composition according to claim 1, wherein $R^5$ and $R^6$ are independently a 3-(o-hydroxyphenyl)propyl group or a 2-(p-hydroxyphenyl)ethyl group.

8. The polycarbonate resin composition according to claim 1, wherein $R^5$ and $R^6$ are independently

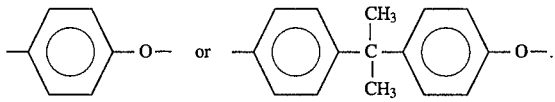

9. The polycarbonate resin composition according to claim 1, which comprises (A) 40 to 99% by weight of said mixture and (B) 60 to 1% by weight of a rubber elastomer.

10. The polycarbonate resin composition according to claim 1, wherein m is more than 100 to 400.

11. The polycarbonate resin composition according to claim 10, wherein the polydimethylsiloxane is in an amount of 1 to 10% by weight.

12. The polycarbonate resin composition according to claim 11, wherein the viscosity average molecular weight is 12,000 to 30,000.

13. The polycarbonate resin composition according to claim 12, wherein said (B) is selected from the group consisting of polyethylene terephthalate; polybutylene terephthalate; Nylon-6; Nylon-4,6; Nylon 6,6; Nylon-6,10; Nylon 6,12; Nylon-11, Nylon-12; Nylon 6/6,6 copolymer; a homopolymer of an α-olefin selected from the group consisting of ethylene, propylene, butene-1, isobutylene, pentene 1,3-methybutene-1,4-methylpentene-1, hexene-1 and octene; an ethyelene-propylene copolymer; an ethylene-vinyl acetate copolymer; an ethylene-methyl acrylate copolymer; an ethylene-ethylacrylate copolymer and ethylene-methyl methacrylate copolymer.

14. The polycarbonate resin composition according to claim 12, wherein said (B) is low density polyethylene, high density polyethylene, isotactic polypropylene, atactic polypropylene, polystyrene, styrene-maleic acid anhydride copolymer, acrylonitrile-butadiene-styrene, polybutadiene, styrene-butadiene-styrene, styrene-butadiene rubber, butadiene-acryl rubber, isoprene rubber, isoprene-styrene rubber, isoprene-acryl rubber, ethylene-propylene rubber, natural rubber, butyl rubber, nitrile-butadiene rubber, nitrile-isoprene rubber, chloroprene rubber, isobutylene-isoprene rubber, ethylene-propylene rubber, ethylene-propylene diene rubber, chlorosulfonated polyethylene rubber, halogenated butyl rubber, urethane rubber, copolymer of alkyl acrylate and acrylonitrile, silicone rubber, fluorine rubber, polyester-polyether-polyester block copolymer rubber epichlorohydrin rubber, and ethylene-vinyl acetate rubber.

15. The polycarbonate resin composition according to claim 12, wherein said (A) is in an amount of 30 to 95% by weight and said (B) is a thermoplastic crystalline resin in an amount of 70 to 5% by weight.

16. The polycarbonate resin composition according to claim 12, wherein said (A) is in an amount of 40 to 99% by weight and said (B) is a rubber elastomer in an amount of 60 to 1% by weight.

17. The polycarbonate resin composition according to claim 16, wherein said (A) is in an amount of 5 to 95% by weight and said (B) is in an amount of 50 to 5% by weight.

18. The polycarbonate resin composition according to claim 12, wherein the n-hexane soluble matter content is 0.3% by weight.

19. The polycarbonate resin composition according to claim 12, wherein the n-hexane soluble matter content is 0.4% by weight.

20. The polycarbonate resin composition according to claim 5, wherein said (B) is polystyrene resin.

* * * * *

UNITED STATES PATENT AND TRADEMARK OFFICE
CERTIFICATE OF CORRECTION

PATENT NO. : 5,488,086
DATED      : January 30, 1996
INVENTOR(S): UMEDA et al

It is certified that error appears in the above-identified patent and that said Letters Patent is hereby corrected as shown below:

Column 25, line 2 (Claim 6): replace "(b)" with --(B)--.

Signed and Sealed this

Eleventh Day of August 1998

Attest:

BRUCE LEHMAN

*Attesting Officer*      *Commissioner of Patents and Trademarks*